United States Patent [19]

Maltby et al.

[11] 4,184,555
[45] Jan. 22, 1980

[54] WEIGHING APPARATUS

[76] Inventors: Thomas F. Maltby, The Red House, Selbourne, Hampshire; Robert C. Maltby, Doscombe Cottage, Hawkley, Hampshire; Alan W. Wakefield, 13 N. Stroud La., Stroud, Petersfield, Hampshire, all of England

[21] Appl. No.: 925,679

[22] Filed: Jul. 18, 1978

[30] Foreign Application Priority Data

Jul. 21, 1977 [GB] United Kingdom ............... 30688/77

[51] Int. Cl.² ........................ G01G 5/04; G01G 21/10
[52] U.S. Cl. ..................................... 177/208; 177/189
[58] Field of Search ......................... 177/208, 254, 189

[56] References Cited
U.S. PATENT DOCUMENTS 3,545,558  12/1970  Maugh ................................. 177/208

Primary Examiner—George H. Miller, Jr.

[57] ABSTRACT

A weighing apparatus, particularly a portable apparatus for weighing vehicles, comprising a resilient body formed of an elastomeric material in which is formed a closed cavity containing a liquid, said cavity being connected by a conduit to an indicator for indicating changes in volume of the cavity when the body suffers changes due to compression forces applied thereto by the member being weighed, said body having a resilient metal plate fixed to an upper surface thereof, a resilient metal load support plate mounted on the plate and a further resilient metal plate embedded in the body and spaced below the plate and to which reaction forces are applied during weighing.

11 Claims, 8 Drawing Figures

WEIGHING APPARATUS

BACKGROUND OF THE INVENTION

This invention relates to a weighing apparatus and particularly, but not exclusively, to a portable weighing apparatus for weighing vehicles.

Portable weighing devices are known which can be placed under a wheel or wheels of a vehicle in order to measure individual wheel or axle loadings but such known devices generally utilize complicated load cells which are prone to failure, the devices are heavy and therefore not readily portable in the sense that they cannot easily be lifted and moved manually, and they are expensive to manufacture.

A mechanical load cell is known from U.K. Specification No. 1374316 which is used for determining the compression forces developed in mine supports, the cell comprising a solid body of compressible synthetic plastics material having an internal cavity filled with gas or liquid connected to an external indicator for indicating changes in pressure in the cavity when the body suffers changes in volume due to compression load, the body having secured thereto end pressure plates. Such a load cell cannot be used as a weighing device as any eccentric load applied to the plates would give a reading different to the same load when applied in the centre of the plates. In a weighing device it is essential for the reading to be accurate even if the load is applied eccentrically of the pressure plate.

SUMMARY OF THE INVENTION

This invention relates as aforesaid to a weighing apparatus and particularly, but not exclusively to a portable weighing apparatus for weighing vehicles.

An object of the invention is to provide a portable weighing apparatus which is accurate even if the load is applied eccentrically.

Another object of the invention is to provide a weighing apparatus which is light in weight, but robust, and can be used for weighing lorries, trucks etc.

According to the present invention there is provided a weighing apparatus comprising a resilient body formed of an elastomeric material, a closed cavity provided in said body, a fluid contained in said cavity, conduit means connecting the cavity to indicator means for indicating changes in volume of the cavity when the body suffers changes due to compression forces applied thereto by the member being weighed, said body having a resilient metal plate or bars fixed to an upper surface thereof, a resilient metal load support plate mounted on said first mentioned plate or bars and a further resilient metal plate embedded in the body and spaced below the first mentioned plate or bars and to which reaction forces are applied during weighing.

The weighing apparatus according to the present invention is portable in the sense that it can be manually lifted. It is robust and therefore not prone to failure and can be manufactured cheaply.

BRIEF DESCRIPTION OF THE DRAWINGS

To the accomplishment of the foregoing and related ends, the invention then comprises the features hereafter fully described and particularly pointed out in the claims, the following description and annexed drawings setting forth in detail certain illustrative embodiments of the invention, these being indicative however of only some ways in which the principle of the invention may be employed.

In said annexed drawings.

DESCRIPTION OF THE PREFERRED EMBODIMENTS

Figure 1:
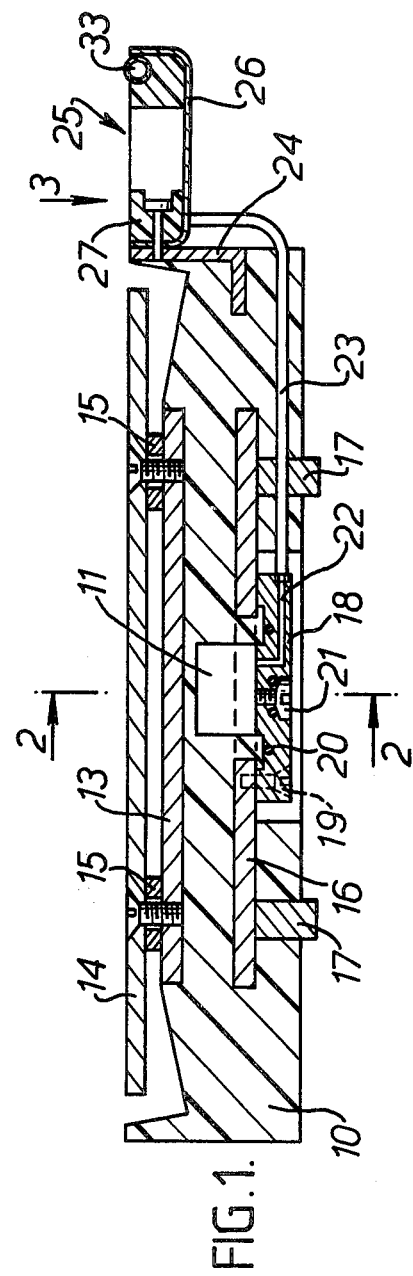
FIG. 1 is a longitudinal section through the weighing apparatus.
Figure 2:
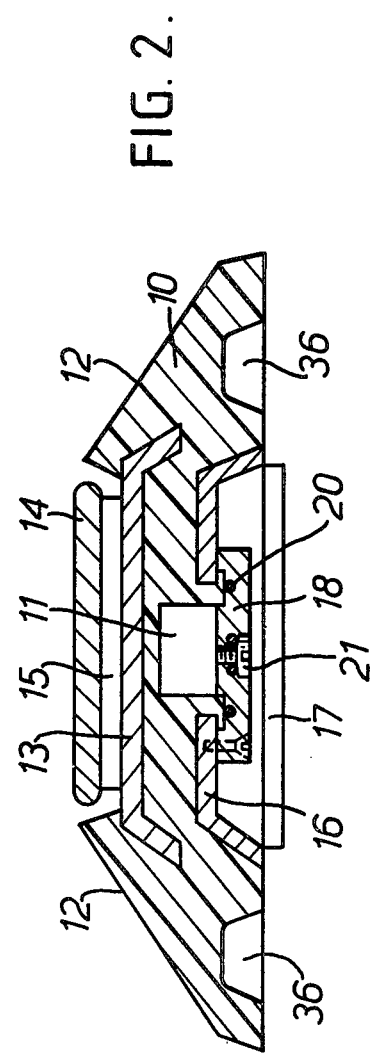
FIG. 2 is a section taken along the line 2—2 of FIG. 1.
Figure 3:
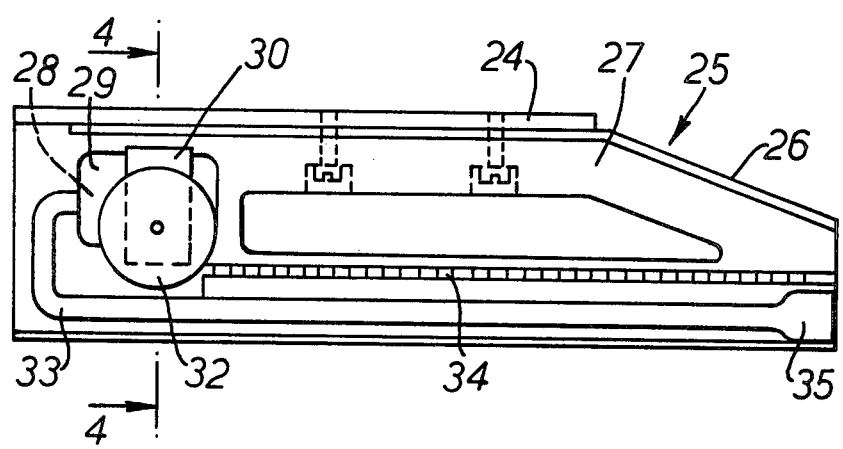
FIG. 3 is a plan view of the handle in the direction of the arrow 3 indicated in FIG. 1.
Figure 4:
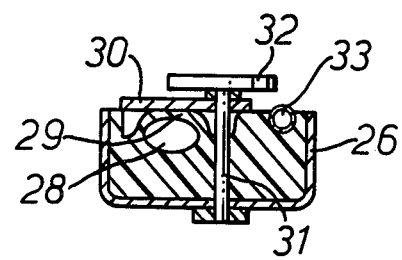
FIG. 4 is a section taken along the line 4—4 indicated on FIG. 3.
Figure 5:
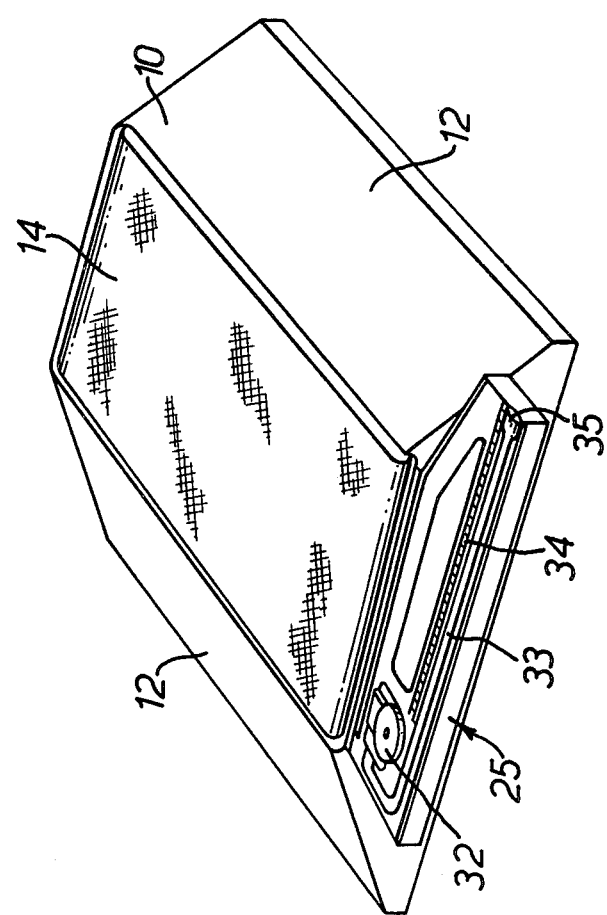
FIG. 5 is a diagrammatic perspective view of the weighing apparatus.

The weighing apparatus has a body 10 formed of an elastomeric material, such as natural or synthetic rubber or a resilient plastics material. Preferably the body 10 is formed of a polybutadiene synthetic rubber. A cavity 11 is formed in the body 10. The sides 12 of the body 10 are inclined to form ramps.

Embedded in the body 10 and extending over the cavity 11 is a yieldable metal plate 13 to which is secured a top metal plate 14. The plate 14 is spaced from the plate 13 by bearing pads formed of an elastomeric material. The plate 14 can therefore move relative to the plate 13 and cannot be brought into direct contact with the plate 13. Any downward load applied to the plate 14 is always applied to the plate 13 through two fixed points, i.e. through the pads 15, irrespective of the position of application of the load to the plate 14, i.e. any eccentrically applied load to the plate 14 will always pass through the fixed points.

Embedded in the body 10 is a bottom yieldable metal plate 16 to which are fixed bottom bearing bars 17. The bars 17 form two fixed reaction points.

The cavity is closed by a closure plate 18 which is secured by screws 19 to the plate 16 and which is sealed with respect to the body 10 by a seal 20. Provided in the plate 18 is an aperture which is closed by a sealing screw 21. Extending through the plate 18 is a passage 22 to which is connected a tube 23.

Embedded in one side of the body 10 is a plate 24 to which is connected a handle 25. The handle 25 comprises a channel section metal stiffening member 26 secured to a moulding 27 formed of an elastomeric material in which is formed a cavity 28 having a deformable wall portion 29. Located above the wall portion 29 is a plate 30 which extends a screw 31 having a circular operating head 32. The screw 31 can be rotated by the head 32 to move the plate 30 downwardly to deform the wall portion 29 and therefore alter the volume of the cavity 28. The tube 23 is connected to the cavity 28 and also connected to the cavity 28 is a readout tube 33 which extends along the handle 25 and is visible. Extending parallel to the tube 33 is a scale 34. The end of the tube 33 is provided with an expansion chamber 35 provided with a vent.

The cavity 11, passage 22, tube 23, cavity 28 contain a liquid or gas. Preferably they contain a liquid which comprises either an ethylene-glycol based liquid or an alcohol-glycerine based liquid.

The underside of the body 10 is provided with cavities 36 in order to reduce the weight of the apparatus. Preferably the apparatus weighs 56 lbs. or less and a weight of 48 lbs. can be achieved.

In use of the weighing apparatus the reading of the liquid in the tube 33 is adjusted to zero on the scale 34 by adjusting the volume of the cavity 28 by means of the screw 31 and plate 20. This is necessary to cater for expansion or contraction of the liquid or gas in the cavity etc. due to ambient temperature changes. Having set the reading to zero a vehicle wheel is run up one of the sides 12 of the body 10 and brought to rest on the plate 14. The plate 14 will bend slightly due to the load applied to it and this load is applied through the pads 15 to the plate 13. The body 10 is compressed between the plates 13 and 16 thus reducing the volume of the cavity 11 causing the liquid or gas to be forced along the passage 22, tube 23, cavity 28 and read-out tube 33. The position of the end of the column of liquid or gas in the tube 33 is read againt the scale 34 which is calibrated in terms of weight and therefore the wheel or axle loading of the vehicle is readily seen.

Figure 6:
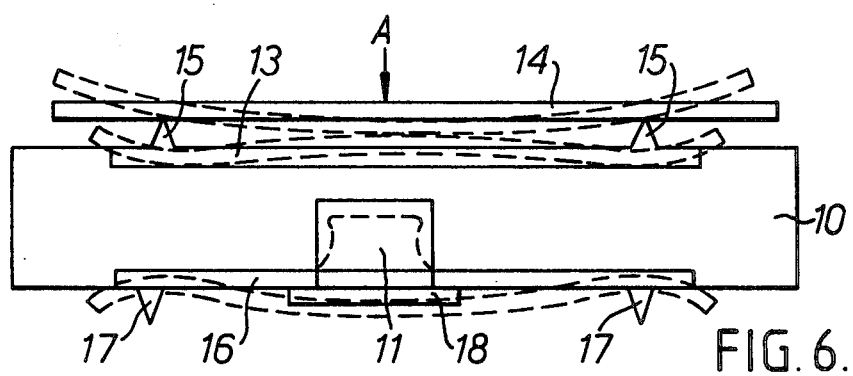
FIG. 6 shows diagrammatically the deflection of the plates and body when a load is applied to the centre of the top plate.

FIG. 6 shows diagrammatically and in exagerated form the deflection of the plates 13, 14 and 16 and distortion of the cavity 11 when a load A is applied in the centre of the plate 14. In this case the cavity 11 is deformed uniformly. The plates 13 and 16 will move towards each other.

Figure 7:
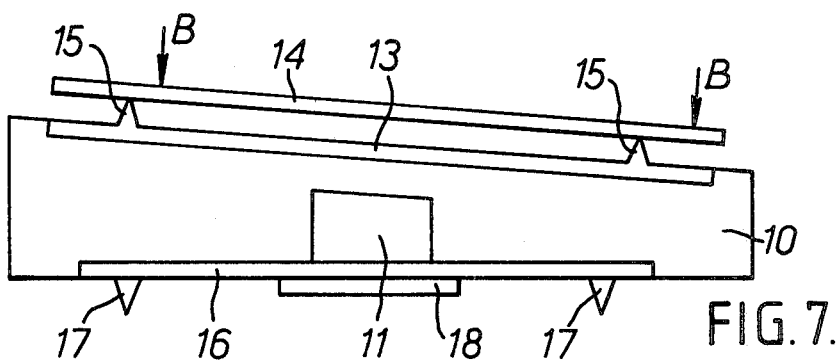
FIG. 7 shows diagrammatically the deflection of the plates and body when a load is applied eccentrically.

FIG. 7 shows the plates 13, 14 and 16 and cavity 11 when an eccentric load B is applied to the plate 14. When the load is eccentric the plate 13 will move closer to the plate 16 at one end compared with the other end but the cavity 11 is distorted and the system largely self-compensating.

The body 10 and plates 13, 16 etc. are shown as being rectangular but they may be circular in plan view. The apparatus can be manually lifted by the handle 25.

In order to more evenly distribute on the ground or surface on which the apparatus rests the load applied to the weighing apparatus, the bars 17 can each be connected on their underside to a plate.

The elongate form of the apparatus shown enables twin wheels of a vehicle to be placed on the plate 14.

To weigh a vehicle, such as a lorry, two weighing apparatus are placed on the ground at the spacing of the front wheels of the vehicle and the vehicle is moved until the front wheels rest on the plates 14 of the two weighing apparatus. The readings of the scales 34 of both weighing aparatus are then noted. The rear wheels of the vehicle are then moved onto the plates 14 of the two weighing apparatus and again the readings of both apparatus are noted. A summation of all the readings will give an accurate indication of the total weight of the vehicle. The summation of each pair of readings will give the weight upon each axle.

The weighing apparatus is light in weight and can be easily lifted manually and can be carried in the drivers cab of a vehicle and used by him at any location to check the weight of his vehicle and thereby indicate to him whether the vehicle is overloaded.

Instead of the displacement of the fluid in tube 33 being read against a scale 34 the fluid may be used to actuate a displacement transducer.

The plates 13, 14 and 16 are all flexible and can deflect, in use of the apparatus, within the elastic limits of the material of which they are made.

The scale 34 can be datached and replaced by another scale 34. The stress/strain properties of the body 10 can fluctuate according to temperature which would give a variation in the reading and this effect can be obviated by the use of replaceable scales 34 to suit the varying climatic conditions.

Even though the apparatus has been described for weighing vehicles, it clearly can be used for weighing other things.

Figure 8:
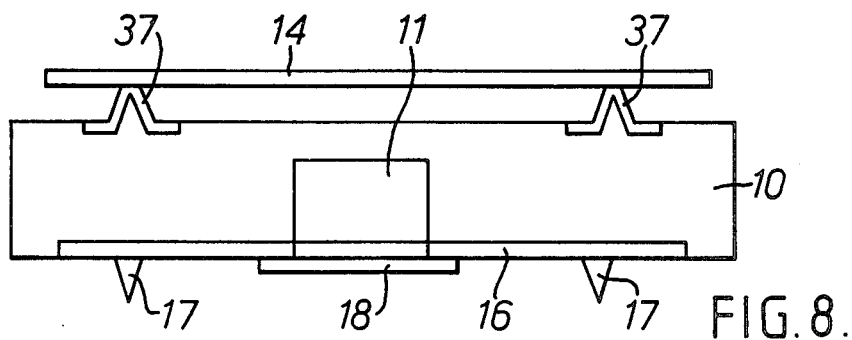
FIG. 8 is a diagrammatic illustration of a modified form of weighing apparatus according to the present invention.

FIG. 8 shows a simple construction in which the plate 13 is replaced by two bars 37 which transmit the load to the body 10. The top plate 14 is connected to the bars 37 in any suitable manner.

We, therefore particularly point out and distinctly claim as our invention:

1. A weighing apparatus comprising a resilient body formed of an elastomeric material, a closed cavity provided in said body, a fluid contained in said cavity, conduit means connecting the cavity to indicator means for indicating changes in volume of the cavity when the body suffers changes due to compression forces applied thereto by the member being weighed, said body having a resilient metal plate or bars fixed to an upper surface thereof, a resilient metal load support plate mounted on said first mentioned plate or bars and a further resilient metal plate embedded in the body and spaced below the first mentioned plate or bars and to which reaction forces are applied during weighing.

2. A weighing apparatus as claimed in claim 1, wherein said load support plate is mounted on the first mentioned plate and spaced therefrom by members which transmit load applied to the load support plate to the first mentioned plate through fixed locations determined by the members.

3. A weighing apparatus as claimed in claim 1, wherein the cavity is connected by a conduit to a second cavity connected to the indicator means, means being provided for deforming the second cavity to cater for expansion or contraction of the fluid due to temperature changes.

4. A weighing apparatus as claimed in claim 1, wherein the cavity is connected by a conduit to a second cavity connected to the indicator means, means being provided for deforming the second cavity to cater for expansion or contraction of the fluid due to temperature changes, said second cavity being formed within a handle secured to the body and being formed in a part of the handle formed of an elastomeric material.

5. A weighing apparatus as claimed in claim 1, wherein the cavity is connected by a conduit to a second cavity connected to the indicator means, means being provided for deforming the second cavity to cater for expansion or contraction of the fluid due to temperature changes, said means for deforming the second cavity comprising a plate movable by a manually operable screw.

6. A weighing apparatus as claimed in claim 1, wherein the cavity is an open cavity formed in the body and closed by a closure plate having a filling aperture closed by a sealed closure screw, said closure plate, being sealed with respect to the body.

7. A weighing apparatus as claimed in claim 1, wherein the body is elongate and has two inclined sides forming ramps.

8. A weighing apparatus as claimed in claim 1, wherein the indicator means comprises an indicator tube extending parallel with a graduated scale.

9. A weighing apparatus as claimed in claim 1, wherein the further plate is provided with bars which extend below the underside of the body and transmit the reaction load to the further plate through fixed locations determined by the bars.

10. A weighing apparatus as claimed in claim 1, wherein the fluid comprises an ethylene-glycol based liquid or an alcohol-glycerine based liquid.

11. A weighing apparatus as claimed in claim 1, wherein the elastomeric material comprises a polybutadiene synthetic rubber.

* * * * *